Figure 1:
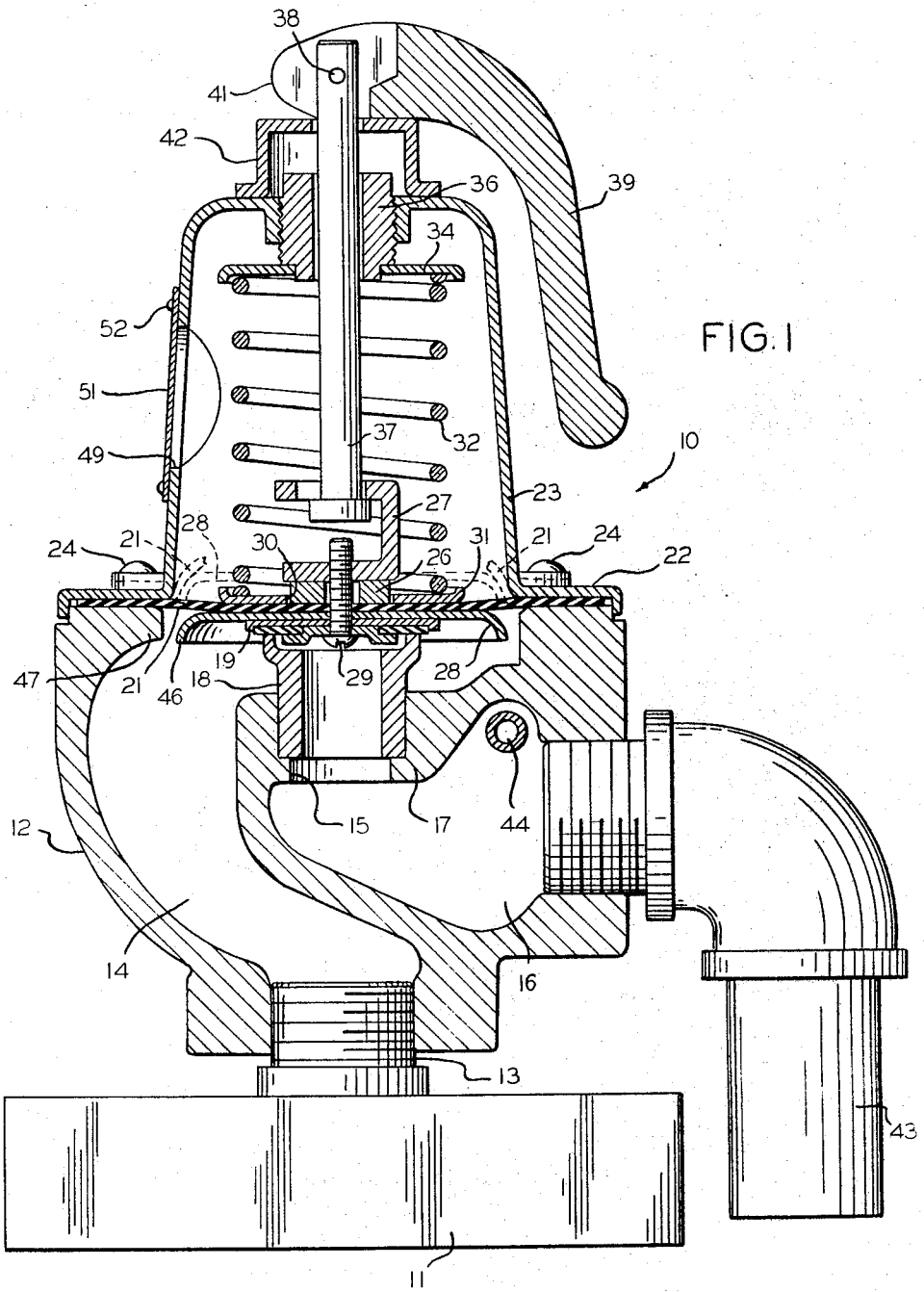

INVENTOR.
HENRY P. BIRKEMEIER
ATTORNEY ically opposed to the claim that the present invention is limited to any particular embodiment or structure.

United States Patent Office 3,294,114
Patented Dec. 27, 1966

3,294,114
PRESSURE RELIEF VALVE HAVING MEANS TO INSURE FULL OPENING UPON FAILURE OF THE DIAPHRAGM
Henry P. Birkemeier, Chicago, Ill., assignor to International Telephone and Telegraph Corporation, a corporation of Maryland
Filed Apr. 23, 1964, Ser. No. 361,953
3 Claims. (Cl. 137—510)

This invention relates to pressure relief valves of the diaphragm type, and relates to improved structure for insuring that the valve will open to full discharge position upon failure of the diaphragm for any reason.

It is a particular object of this invention to provide an improved diaphragm operated relief valve characterized by structure whereby the valve closure member will more rapidly open to full discharge position upon failure of the diaphragm.

Another object is to provide a diaphragm operated relief valve characterized by a spring plate bearing against a valve disc assembly arranged to hold the diaphragm therebetween, the valve disc assembly including an auxiliary disc having a diameter slightly smaller than the inside diameter of a pressure chamber subject to boiler pressure, said auxiliary disc holding the diaphragm and being movable with the ruptured diaphragm against the inner surface of the valve bonnet so as to maintain a large pressure differential across the valve disc assembly, thereby insuring that upon failure of the diaphragm the valve will be maintained in fully opened discharge position.

In one form of the invention the auxiliary disc is located somewhat freely on the valve disc assembly and is normally free to center itself for movement with the ruptured diaphragm to a proper centered and sealing position against the valve bonnet, and moreover is movable with respect to the valve pressure chamber upon varying pressure conditions to prevent any corroding of the auxiliary disc during standby conditions.

It is accordingly still another object to provide a relief valve having an auxiliary valve disc capable of limited movement laterally of the valve disc assembly for the purpose of enabling the auxiliary disc to be properly centered on valve operation, and for the purpose of minimizing any effect of corrosion of the boiler water.

Other objects and important features of the invention will be apparent from a study of the specification following taken wtih the drawings, which together describe and illustrate some preferred embodiments of the invention and what are now considered to be the best modes of practicing the principles thereof. Other embodiments of the invention may be suggested to those having the benefit of the teachings herein, and such embodiments are intended to be reserved, especially as they fall within the scope and purview of the subjoined claims.

Figure 2:
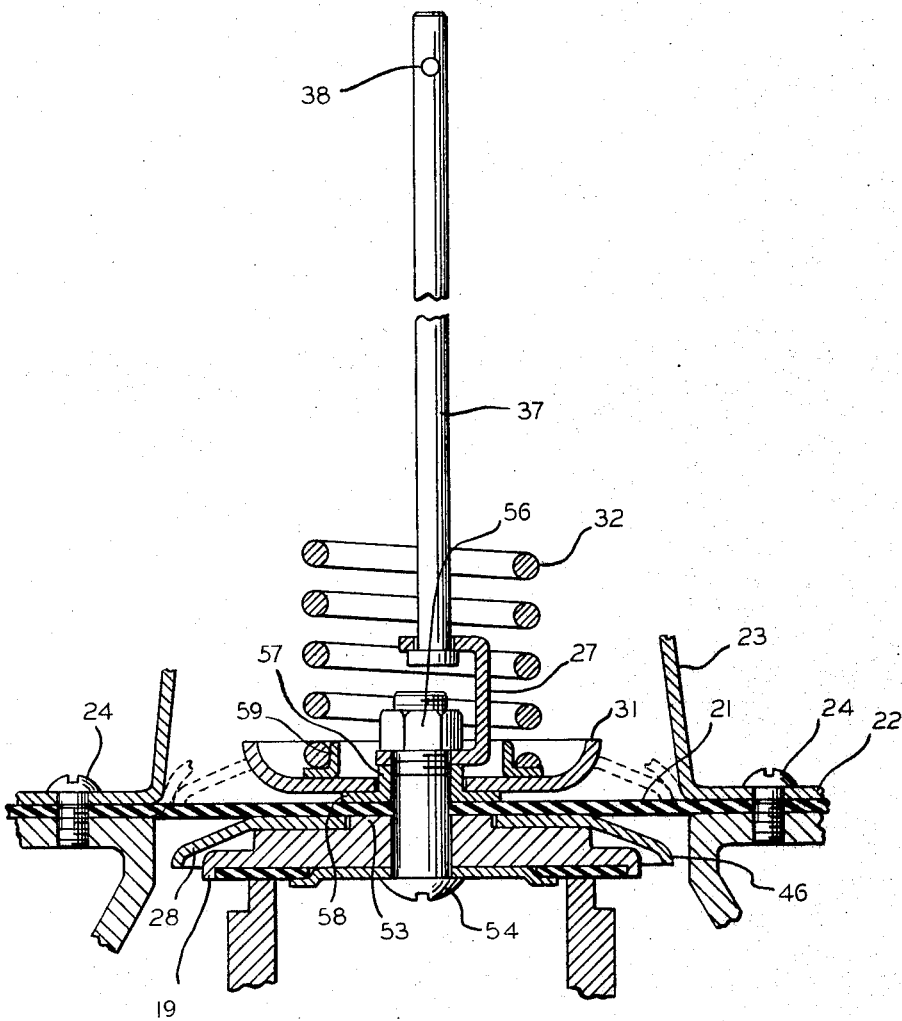

In the drawings:

FIG. 1 shows an improved pressure relief valve according to the present invention, the valve being shown in operative relationship with respect to a hot water boiler; and FIG. 2 shows a detail of an alternate embodiment of such valve.

Referring to the drawings, the improved valve according to one embodiment of the present invention is designated generally by the reference numeral 10, and is shown in operative relationship to a hot water boiler 11, such as may form part of a hot water heating system. The valve 10 includes a body member 12 connected by a short nipple 13 to the boiler 11. The body member 12 has an inlet passageway 14 and an outlet passageway 16, there being a partition 17 between the two passageways 14 and 16. Partition 17 has an opening 15 therein to receive an annular valve seat 18 supported on the partition 17. A valve disc assembly 19 is adapted to close on the seat 18 to maintain pressure at a predetermined level in boiler 11.

Valve disc 19 is part of a valve operating assembly including a diaphragm 21 which is held along its periphery between the valve body 12 and a rim flange 22 of a valve bonnet 23. Cap screws 24 hold the diaphragm 21 and the bonnet 23 to the valve body 12.

The diaphragm 21 is held at the inner part thereof between an assembly comprising a center washer 26, a lifter link 27 and an auxiliary valve disc 28, the assembly being held together by means of a screw 29 bearing against the underside of the auxiliary disc 28 and tapped into the lifter link 27. It will be noted that the boiler pressure is always effective against the underside of the auxiliary disc 28.

A generally cup-shaped spring plate 31 has a central aperture 30 so as to nest around the central washer 26, and is urged against the diaphragm 21 by a spring 32 which in turn bears against the upper side of the spring plate 31, the upper end of spring 32 bearing against an upper spring seat 34. Adjustment of the tension in the spring 32 is achieved by a hollow adjusting nut 36 threaded into the top of the bonnet 23 and bearing against spring seat 34.

For purposes of manually opening the valve assembly thus far described to the discharge position, the lifter link 27 is connected to a stem 37 loosely connected at its lower end to the lifter link 27. The stem 37 extends through the hollow adjusting nut 36, and is connected by a pin 38 to an operating handle 39. A cam nose 41 on one end of the operating handle 39 operates with a closure 42 for bonnet 23, so that the rocking of the handle 39 in a counter-clockwise direction will lift the stem 37 and the valve disc 19 from its seat 18.

During the normal operation of the valve 10, the pressure against the lower side of the diaphragm 21 is opposed by the pressure in the spring 32. In the normal operation, if there is an excess of pressure at the boiler 11, it will be relieved past the valve disc 19, so that pressure will be relieved in the passage 14 to the outlet passage 16. It may be noted that the outlet passage 16 is connected to a discharge pipe 43. A small vacuum opening 44 in the discharge passageway 16 operates to break any vacuum which conceivably could be manifest against the lower side of the valve disc 19, and cause the valve 10 to operate at a pressure in excess of which it was designed for.

However, upon conditions under which the diaphragm ruptures or malfunctions for some reason, as by reason of excessive age, structure is provided for insuring that such malfunction of the diaphragm 21 will not cause the valve to operate to less than a fully open position. This is important because of the fact that if the boiler is at an excess pressure, such pressure must be relieved rapidly, and upon failure of the diaphragm it must not impede the rapid dissipation of pressure from the boiler 11. This is particularly true in cases where valve described is used with pressurized hot water heating systems. Upon release of pressure in such systems the heated water turns in part to steam, the large volume of which must be dissipated rapidly.

To foregoing end, the auxiliary valve disc 28 has an annular flange 46 which is curved in diametral cross-section as shown. The auxiliary valve disc 28 has a diameter slightly smaller than the inside diameter of the inlet chamber 14 as defined by an annular rib 47 thereof at the top of valve body 12. It will be noted that the diameter of auxiliary valve disc 28 is effectively that of the diaphragm 21 in causing valve operation.

If the diaphragm 21 ruptures for some reason or other, full pressure will be manifest at all times against the auxiliary disc 28 to cause the same to move against the inner surface of the bonnet 23, as shown by the dotted lines in FIG. 1, with the ruptured diaphragm 21 therebetween. In order to insure that there is no back pressure opposing such movement the bonnet 23 has a relief opening 49 therein for relief of such back pressure. Opening 49 may be loosely covered by a cover 51 capable of being burst from retaining rivets or small screws 52 held in bonnet 23. Except for the small part of the ruptured diaphragm exposed to the boiler pressure at chamber 14, substantially all of the boiler pressure is manifested against auxiliary disc 28, and an effective seal is made against the bonnet 23 by diaphragm 21. Any pressure leak through diaphragm 21 is rapidly dissipated through the opening 49 at cover 51.

Referring now to FIG. 2 of the drawings, there is shown another embodiment of the invention wherein the auxiliary disc 28 is somewhat loosely centered on a boss 53 formed as part of the valve disc 19. In this embodiment the valve disc 19 is held to the valve operating assembly by a bolt 54 and nut 56, lifter link 27 bearing against a flanged washer 57 having a flange 58 bearing against diaphragm 21. Boss 53 and flange 58 hold diaphragm 21 therebetween.

In this embodiment the lower end of spring 32 bears against a spring retainer 59 which in turn bears against spring plate 31.

By reason of the fact that auxiliary valve disc 28 has a somewhat loose fit on boss 53 it can readily center itself when the valve 10 moves to pressure relief position upon rupture of diaphragm 21. Moreover, when the boiler pressure varies and the diaphragm 21 flexes, the auxiliary disc 28 will move slightly. This will prevent the peripheral margins from corroding to the valve body during normal operating conditions.

It will be apparent, therefore, that upon rupturing or other malfunction of the valve diaphragm, that full opening of the valve will be had instead of partial opening thereof. When the invention has been described in terms of some preferred embodiments thereof, its scope is not intended to be limited by the precise embodiments herein shown, nor otherwise by the claims here appended.

I claim:
1. A pressure relief valve comprising a valve body having an inlet and an outlet and a valve seat between said inlet and outlet, a valve disc operatively related to said seat, a valve bonnet secured to said valve body, a diaphragm secured to said valve disc and having the periphery thereof secured between said valve body and said valve bonnet, an auxiliary valve disc exposed to inlet pressure and bearing against the underside of said diaphragm, a spring plate bearing against the opposite side of said diaphragm, spring means acting between said bonnet and said spring plate and normally urging said disc against said seat, the diaphragm and auxiliary valve disc being responsive to a predetermined inlet pressure to move the disc away from said seat, and structure providing for the operation of said valve to full relief opening upon rupture of said diaphragm comprising a substantially circular opening in said valve body across which opening said diaphragm extends, the diameter of said opening being slightly greater than the diameter of said auxiliary valve disc, the portion of said bonnet adjacent the part secured to said body having an inner surface the size of which is sufficiently larger than said auxiliary valve disc to permit the clamping of said diaphragm therebetween, an annular flange on said auxiliary valve disc, said diaphragm and said auxiliary valve moving against the inner surface of said bonnet with said diaphragm therebetween upon rupture of said diaphragm to seal said ruptured diaphragm and provide for pressure relief only by way of said outlet.

2. The invention as defined in claim 1 wherein said valve bonnet is vented to atmosphere on the side of said diaphragm opposite to the inlet, so that said ruptured diaphragm and said auxiliary valve disc may freely move to arrested position upon rupture of said diaphragm.

3. The invention as defined in claim 1 wherein said valve disc has structure providing for limited lateral movement with respect to said diaphragm whereby said auxiliary can center itself properly with respect to said bonnet.

References Cited by the Examiner
UNITED STATES PATENTS

| | | | |
|---|---|---|---|
| 1,210,913 | 1/1917 | Dougherty | 137—510 XR |
| 1,863,075 | 6/1932 | Terry | 137—510 |
| 3,113,756 | 12/1963 | Griffo | 137—505.42 XR |

FOREIGN PATENTS

| | | |
|---|---|---|
| 563,208 | 8/1944 | Great Britain. |

ALAN COHAN, *Primary Examiner.*

HAROLD WEAKLEY, WILLIAM F. O'DEA,
*Assistant Examiners.*